United States Patent Office 3,423,213
Patented Jan. 21, 1969

3,423,213
METHOD OF PREPARING VITAMIN A-FORTIFIED FROZEN POTATO PRODUCTS
Frederick H. Vahlsing, Jr., Allentown, N.J., assignor to Vahlsing, Inc., a corporation of Delaware
No Drawing. Filed Mar. 9, 1966, Ser. No. 532,853
U.S. Cl. 99—193                 6 Claims
Int. Cl. A23b 7/00; A23l 1/12

ABSTRACT OF THE DISCLOSURE

A method of providing freeze storage stable vitamin A fortification in frozen potato solids comprising frying potato solids in a frying oil which contains beta-carotene in an amount effective to fortify the vitamin A content of the potato solids and then freezing the potato solids.

---

This invention relates to a method of producing vitamin A-fortified frozen potato products. More particularly the invention provides a method of adding and stabilizing beta-carotene, or provitamin A, upon the surface of frozen potato products whereby decrease of the beta-carotene content during freeze storage is substantially eliminated.

As is known, beta-carotene is sometimes called provitamin A because beta-carotene can be converted in the digestive systems of animals into a substance which gives the activity of vitamin A. Thus, as a precursor of in vivo vitamin A, beta-carotene is often used as a substitute additive for vitamin A itself. It is also known, however, that the beta-carotene content of frozen foods, such as fruits and vegetables, in some unknown manner decreases markedly during storage during freezing temperatures. For example, the amount of added or naturally-contained beta-carotene in frozen foods may decrease by 25% or more after relatively short storage. For this reason it has been virtually impossible heretofore to achieve an effective long-term vitamin A fortification of frozen foods by addition of beta-carotene.

It has now been discovered that beta-carotene can be stabilized on the surface of frozen potato products whereby the original amount of beta-carotene on such products remains substantially the same even after prolonged periods of storage at freezing temperatures. More specifically, the invention is based upon the surprising and unexpected discovery that if beta-carotene is added to a frying oil for fried frozen potato products, then the frying of potatoes in such oil not only results in the beneficial pick-up of beta-carotene upon the surface of the potatoes, but this beta-carotene is also stabilized in some unknown manner so that it remains without diminution after the potato products have been stored in the frozen condition.

No definite explanation or reasons have been found to date for this unique effect of a frying oil and a frying step in stabilizing beta-carotene against freezing temperature losses in potatoes. However, the invention has great value for treatment of those potato products which are either completely or partially fried before they are frozen for the commercial market. For example, the ordinary frozen french fried potato can be readily fortified with vitamin A by addition of beta-carotene to the frying oil and subsequent frying of the potatoes with such modified oil. Other products such as potato buds, which comprise potato shreds or particles reformed into larger compacted masses, can also be benefited by frying in the modified frying oil containing beta-carotene. In addition, potato chips and other fried potato products can be readily fortified with beta-carotene without the danger of unexplicable substantial losses of the additive during freeze storage, as has been heretofore experienced.

In carrying out the invention, cleaned white potatoes are first cut into pieces suitable for the particular product that is to be produced. For example, for frozen french fried potatoes, the potatoes may be cut into the so-called shoe-string shape or the crinkle-cut shape and then treated in a frying oil containing beta-carotene. Potato buds previously described above may also be reformed in known manner by compacting potato shreds or small particles in cylinders measuring approximately ¾" x 1½" and these compacted masses may be fried in a modified frying oil in accordance with the invention. The preparation of potato pieces for a frying treatment as described above is a well known conventional step in the art and any of the known processes for producing cut potato pieces may be used.

As is also known in the art, the potato pieces can be fried in various hydrogenated vegetable oils such as hydrogenated cottonseed oil. The time of frying may vary from about 30 seconds to four minutes and the temperature of frying may vary from about 325° F. to about 385° F. Within these ranges the particular conditions that are employed will depend for the most part on the consumer for whom the product is intended. For example, where frozen french fried potatoes are to be prepared for restaurants or other commercial institutions, a short par-frying treatment will be given so that the commercial institution may complete frying according to its requirements. On the other hand, for the home consumer, frying in the manufacturing plant may be carried out to a much greater degree since the average consumer will usually use an oven or broiler to heat and brown the potatoes without additional frying. In either case, the particular conditions of frying may be selected as desired within the ranges set forth above.

In accordance with the invention, the frying oil to be used for frying the products mentioned above is modified by addition of a small amount of beta-carotene thereto. This beta-carotene may be added as solids or, more conveniently, it may be added as a suspension of fine solids in a vegetable oil which is compatible with the oil that is to be used for frying. Another way of adding the beta-carotene is to use a partial solution and partial suspension of the beta-carotene solids in an edible oil medium, or in other cases a complete solution may be used since the beta-carotene is fat soluble.

As to the amount to be added, only a very small amount is necessary in order to fortify the potato product with a physiologically active and beneficial quantity of the beta-carotene which after ingestion is converted into vitamin A. In general, up to about 0.025% of beta-carotene can be added based on the weight of the frying oil that is to be used. In carrying out the invention excellent results have been achieved with use of about 0.0010% to about 0.0020% of beta-carotene based on the weight of frying oil and such amounts are recommended. There is no actual lower limit of the amount of beta-carotene to be added since even the presence of small amounts will give some benefit. In general however, at the very least 0.0004% of beta-carotene should be added to the frying oil in order that a significant amount may be absorbed upon the surface of the potato solids which will give benefits in the form of vitamin A when the beta-carotene is converted in vivo.

If the frying oil is to be used over relatively long periods during large scale manufacturing operations, it is also recommended that antioxidants be included to stabilize the beta-carotene against high temperature degradation by oxidation. It is known that beta-carotene is susceptible to destruction by oxidation and this effect can be readily diminished or overcome by adding antioxidants to the frying oil. Excellent results have been achieved by adding small amounts of a mixture of butylated hydroxy anisole and propyl gallate. However, any other antioxidants which can be tolerated in food applications such as butylated hydroxy toluene can be used. The amount of the antioxidant will be very small and in general will comprise up to 0.5% by weight based on the weight of the beta-carotene that is to be added.

As previously described, the potato solids are submerged in the hot frying oil at temperatures from about 325° F. to about 385° F. and are fried in the oil from anywhere from about 30 seconds to about four minutes. During this time the beta-carotene contained in the frying oil will be absorbed upon the surface layers of the potato products. The amount absorbed varies directly with the beta-carotene concentration in the frying oil, and therefore control over the frying oil concentration will also control the amount absorbed on the potato products. In addition to the freeze storage stability provided by the frying step, further benefit is the fact that the frozen final product will have a pleasing light yellow color due to the natural pigmenting action of beta-carotene.

After the frying has been completed, the potato product is removed from the frying oil, excess oil is shaken off and then the product is frozen at any freezing temperature, preferably well below 32° F. For example, a temperature of $-20°$ F. will quickly freeze the product and then the product can be packaged for commercial shipment and storage. As previously mentioned, the frying treatment in some way stabilizes the beta-carotene so that the original amount thereof remains virtually the same notwithstanding long periods of storage of the product at freezing temperatures.

Further details of the invention will be understood from the following example which illustrates one embodiment of the method thereof.

Strips of potatoes were cut from clean, white raw potatoes in elongated shapes which were suitable for manufacture of frozen french fried potatoes. The potato strips were submerged in a vat containing hot hydrogenated cottonseed oil having a temperature of approximately 385° F. To this oil had been previously added a suspension of beta-carotene dispersed in a peanut oil vehicle along with the antioxidants butylated hydroxy anisole and propyl gallate. The concentration of the beta-carotene in this suspension was 22% by weight and it was added to the cottonseed oil in the proportion of one pound per 15,000 pounds of the oil, thus giving a weight percent concentration of 0.0014% of beta-carotene based on the weight of the oil. The potato strips were fried in the oil for approximately three minutes and then removed from the vat. Excess oil was shaken off the potato strips and then the strips were immediately frozen at $-20°$ F.

After storage for six months at 0° F., the original beta-carotene content of the potatoes remained substantially the same. Also a light yellow color in the originally frozen potatoes remained substantially the same over the same storage period.

It will be understood that it is intended to cover all changes and modifications of the preferred embodiments of the invention, herein chosen for the purpose of illustration, which do not constitute departures from the spirit and scope of the invention.

I claim:
1. A method of providing freeze storage stable vitamin A fortification in frozen potato solids which comprises frying potato solids in a frying oil which contains beta-carotene in an amount effective to fortify the vitamin A content of said potato solids and then freezing said potato solids.

2. A method as in claim 1 wherein said frying oil also contains an antioxidant.

3. A method as in claim 1 wherein said frying oil contains a maximum of about 0.025% beta-carotene by weight based on the weight of said frying oil.

4. A method as in claim 1 wherein said potato solids are fried for about 30 seconds to about four minutes at frying oil temperatures from about 325° F. to about 385° F.

5. A method as in claim 1 wherein said frying oil also contains butylated hydroxy anisole and propyl gallate.

6. A method as in claim 1 wherein said fried potato solids are frozen at about $-20°$ F.

References Cited

UNITED STATES PATENTS

| 2,789,056 | 4/1957 | McColm et al. | 99—100 |
| 3,039,877 | 6/1962 | Borenstein | 99—148 |
| 3,050,404 | 8/1962 | Traisman | 99—193 |

OTHER REFERENCES

Burdick, E. M., Economic Botany, vol. 10, 1956, Extraction and Utilization of Carotenes and Xanthophylls (pp. 267–279).

A. LOUIS MONACELL, *Primary Examiner.*

D. M. NAFF, *Assistant Examiner.*

U.S. Cl. X.R.

99—100, 148